Figure 1:
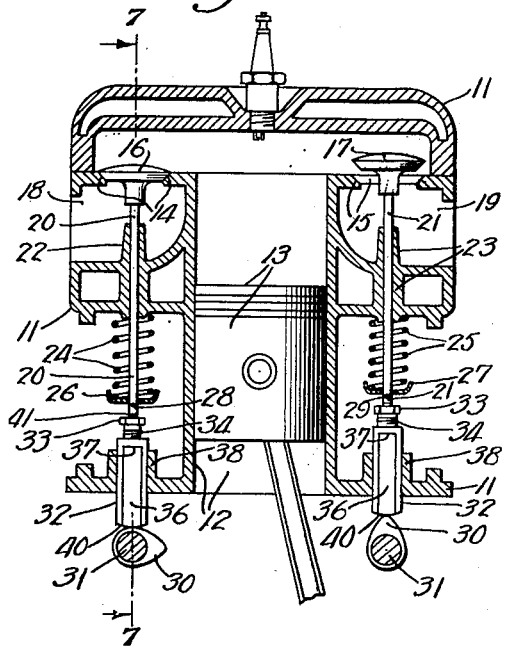

Nov. 11, 1930.  H. L. DARDELET  1,780,999
VALVE MECHANISM
Filed Jan. 5, 1929     2 Sheets-Sheet 1

INVENTOR
Hugues Louis Dardelet.
BY
ATTORNEYS

Nov. 11, 1930.  H. L. DARDELET  1,780,999
VALVE MECHANISM
Filed Jan. 5, 1929  2 Sheets-Sheet 2
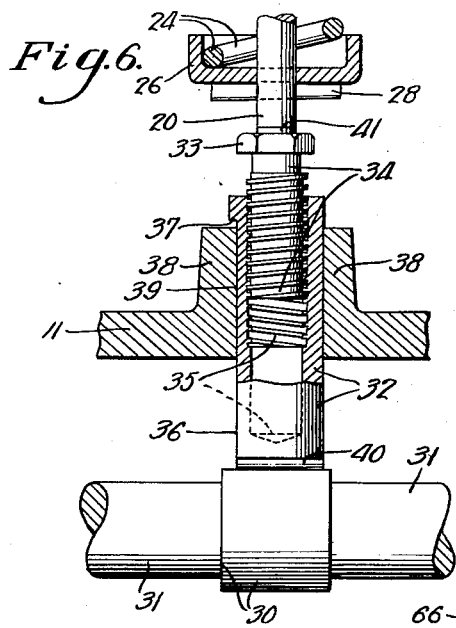
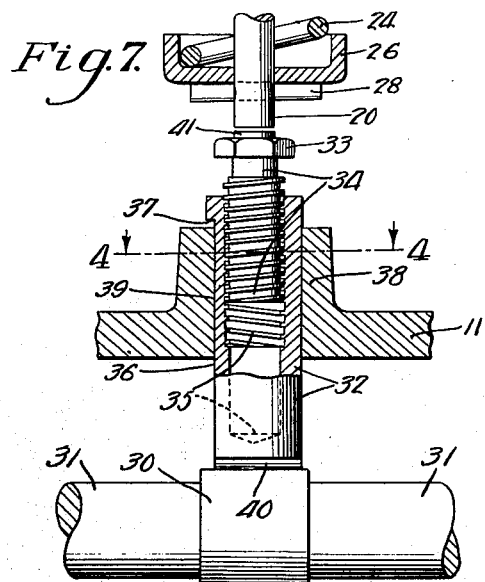
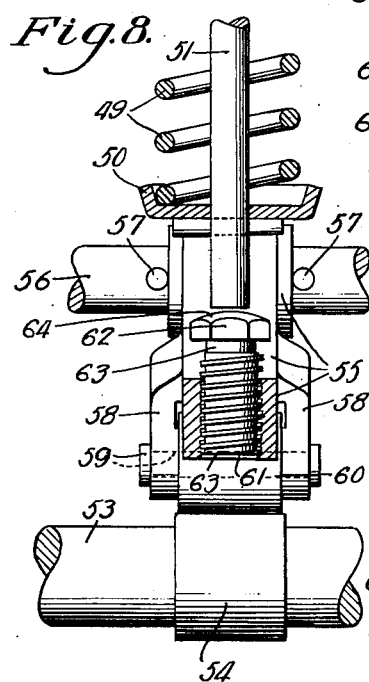
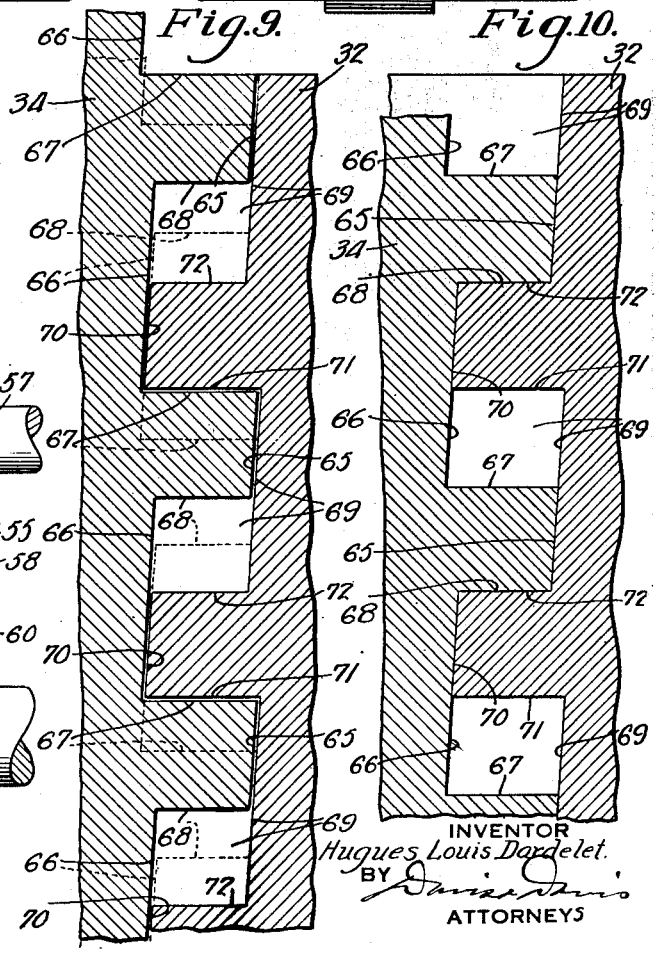
INVENTOR
Hugues Louis Dardelet.
BY
ATTORNEYS Patented Nov. 11, 1930

1,780,999

UNITED STATES PATENT OFFICE

HUGUES LOUIS DARDELET, OF NANTES, FRANCE, ASSIGNOR, BY MESNE ASSIGNMENTS, TO DARDELET THREADLOCK CORPORATION, OF NEW YORK, N. Y., A CORPORATION OF DELAWARE

VALVE MECHANISM

Application filed January 5, 1929. Serial No. 330,451.

This invention relates to improvements in valve mechanisms.

One object of the invention is to provide a highly efficient valve mechanism. Another object of the invention is to provide a poppet valve actuating mechanism, especially adapted for use in internal combustion engines, which may be easily and quickly and accurately adjusted and will hold the desired adjustment. A further object of the invention is to provide an efficient adjustable tappet device for operating valves and other movable devices or machine elements. Another object of the invention is to provide a tappet mechanism wherein one member is provided with a contact head having a screw thread connection therewith for adjustment toward and from a point of contact on a second member, said connection being such that the head is adapted to be locked against accidental turning movement by direct axial jamming of the threads of the connection resulting from operation of the tappet mechanism.

Other objects and advantages of the invention will appear from the following description of the embodiments of the invention illustrated in the accompanying drawings.

Figure 2:
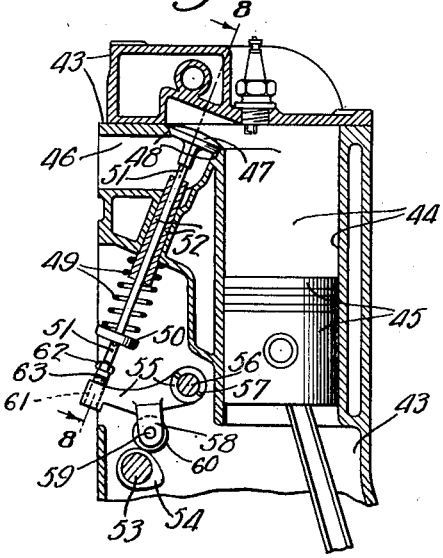
Figure 3:
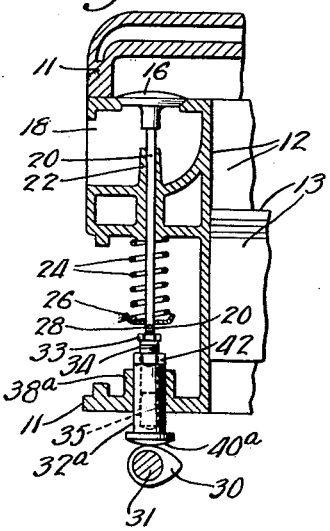
Figure 4:
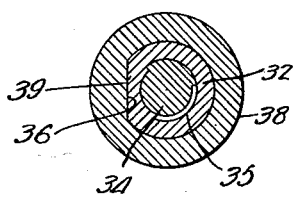
Figure 5:
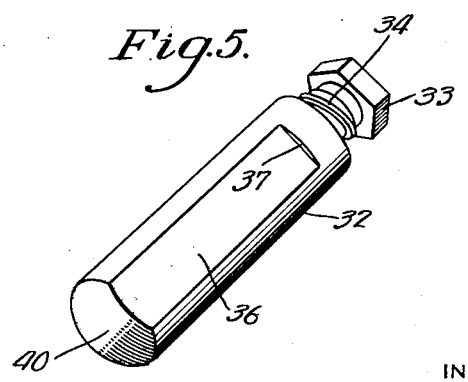

In the drawings:

Fig. 1 is a fragmentary vertical sectional view of an internal combustion engine showing one embodiment of the invention;

Fig. 2 a fragmentary vertical sectional view of an internal combustion engine showing another embodiment of the invention;

Fig. 3 a fragmentary vertical sectional view of an internal combustion engine showing a third embodiment of the invention;

Fig. 4 a section on the line 4—4 of Fig. 7;

Fig. 5 a perspective view of the adjustable tappet shown in Figs. 1, 4, 6 and 7;

Figs. 6 and 7 detail views partly in section on the line 7—7 of Fig. 1, showing, respectively, the initial and final stages of adjustment of the tappet device;

Fig. 8 a detail view, partly in section on the line 8—8 of Fig. 2, showing the tappet adjustment completed;

Fig. 9 a detail sectional view showing the form of the tight-locking adjustable thread connection between the two portions of each of the several tappet devices illustrated in Figs. 1, 2 and 3, the relative positions of the threads in full lines being that at which the threads are crosswise displaced for maximum freedom of entry of one thread in the other, while the relative positions of the threads shown in dotted lines is that normally assumed under the action of gravity and in which the two sections of the tappet are connected for easy screwing of the upper section up or down at the pitch rate; and Fig. 10 a view similar to Fig. 9 showing the threads displaced crosswise of the threads, or axially of the thread connection, to the opposite limit of the thread displacement from that shown in full lines in Fig. 9, with the two sections of the tappet tightly held by the mutual gripping of the threads against accidental relative turning movement.

While the present invention has been illustrated as embodied in valve mechanism for internal combustion engines, certain well known forms of automobile engines being illustrated, it will be obvious that the invention is not limited in its application to valve mechanism for such engines, but is applicable to tappet mechanism in general for operating valves and other devices or parts and, in fact, to a wide variety of adjustable motion-transmitting means wherein an actuating member transmits power in one direction to an actuated member.

Referring first to the embodiment of the invention illustrated in Figs. 1, 4, 5, 6, 7, 9 and 10,—11 designates the engine casting, 12 one of the engine cylinders, 13 the piston working in said cylinder, 14 and 15 the seats for the exhaust and inlet valves 16 and 17, respectively, and 18 and 19 the exhaust and inlet passages leading, respectively, to the exhaust and intake manifolds of the engine (not shown). Valves 16 and 17 are fixed on the upper ends of stems 20 and 21 reciprocable vertically in bearings or tubular guides 22 and 23, and said valves are normally urged downward toward their seats by the usual helical springs 24 and 25 the upper ends of which abut the engine casting and the lower ends of which abut the usual valve stem collars 26 and 27 held on the stems against downward movement in any suitable manner, as by the pins 28 and 29. The valve stems project downward below said collars for engagement of the contact heads of the valve operating tappets under the bottoms of said stems to lift the valves from their seats.

A separate operating tappet is provided for each valve. The tappets are reciprocated in properly timed sequence by the usual cams 30 fixed on the usual rotary cam shafts 31 of the engine. All of the foregoing parts, except the tappet are of well known construction.

Each tappet comprises a main lower body portion 32 and an upper adjustable impact section comprising a contact head 33 having a threaded stem 34 screwed into a threaded socket 35 in the body portion 32. A portion of the exterior of the cylindrical body portion 32 of the tappet is cut away to provide a flat face 36 extending longitudinally of said body portion from the lower end thereof, said flat face preferably terminating short of the upper end of the body portion to provide a downwardly facing shoulder 37. This flat-faced body portion of the tappet extends through and is vertically reciprocable in a vertically extending tubular guide bearing 38 in the engine casting 11, said guide bearing having its guide passage of the same horizontal cross-sectional contour as this flat faced body portion, i. e. having one flat side face 39 extending the full length of the bearing. The tappet may thus be dropped downward in the guide bearing in assembling and will be guided for vertical reciprocation without axial rotation. Shoulder 37 will engage the upper end of the guide bearing in the absence of the cam shaft or cam to prevent dropping of the tappet bodily and entirely through the bearing but preferably is arranged, as shown, so as not to engage the bearing at any time when the cam 30 is in assembled position below the tappet.

To reduce the weight of the tappet, the socket 35 is preferably extending substantially the full length of body portion 32 which thus has the form of an internally threaded tube with a closed bottom. The bottom face 40 of this closed lower end of portion 32 of the tappet rides on the periphery of cam 30 and is preferably convex, as shown, on any line extending transversely of the cam shaft 31 so that the thrust of the cam on the tappet is always in a plane parallel with the axis of the cam shaft and passing through the axes of the shaft and cam and the longitudinal center lines of the tappet and valve and valve stem. Ease of operation of the several parts of the valve mechanism is thus obtained.

The contact head 33 of the tappet is formed with flat sides faces, preferably being hexagonal in plan view, as shown, for effective engagement of a wrench with said head for adjusting the head. The upper or top face of the head 33 may be of flat, dome, or other suitable configuration. As shown, with a reciprocating type of tappet I prefer to form the head with a short, cylindrical, upstanding, rod-like, central extension 41 having a flat upper end disposed in axial alignment with the valve stem below the lower end of the stem which it is adapted to strike to lift the valve from its seat against the resistance of the valve seating spring.

In the modification illustrated in Fig. 3 the engine is of the same type as that shown in Fig. 1, only the exhaust valve for one cylinder being shown. The parts are all constructed and arranged as described in connection with Fig. 1 with the exception of the main body or lower section of the two part tappet and the bore or passage of the guide bearing for said tappet section. In the modified construction the main section 32$^a$ of the tappet is cylindrical, the flat face 36 being omitted, and the bore of guide bearing 38$^a$ is also cylindrical, so that the tappet is axially rotatable as well as longitudinally reciprocable in said bearing. The main section of the tappet is formed at its lower end with an enlarged dome or mushroom shaped head 40$^a$ the central portion of which rides on cam 30, and said section is formed with a reduced upper end portion 42 of hexagonal external contour. The tappet is therefore adapted to be passed upwardly in the bearing in assembling the parts, and the lower section is adapted to be held against rotation, during screwing of the adjustable head 33—34 up or down in the threaded socket 35 of the lower section, by means of a wrench engaged with hexagonal portion 42.

In Figs. 2 and 8 a different type of internal combustion engine is illustrated, only one cylinder and its associated exhaust valve mechanism being shown. This modification shows the invention embodied in a poppet valve mechanism employing a pivoted tappet. The engine casting 43 is formed with a cylinder 44 in which works the piston 45. The exhaust passage is designated 46, and the exhaust valve 47 is normally urged to its seat 48 by the valve spring 49 which is interposed between the engine casting and a collar 50 pinned on the valve stem 51. The valve stem reciprocates in a tubular guide 52 and projects downward below the collar 50. The rotating cam shaft for operating the valve is designated 53, a pivoted tappet being interposed between the exhaust valve stem and the cam 54 fixed on said shaft. All of the foregoing parts are of well known construction with the exception of the pivoted tappet.

The pivoted tappet comprises a main body portion in the form of an outwardly extending arm 55 pivoted at its inner end to swing up and down about the usual tappet pivot rod 56 mounted in the engine casting as is common in engines of this type, said arm being held against axial sliding on the rod by suitable means, such as a pair of pins 57 carried by the shaft at opposite sides of the arm. Arm 55 extends outward across the cam shaft 53 and is preferably provided about midway its ends with a pair of pendent arms 58 at opposite sides thereof carrying the axle 59 of a roller 60, which roller contacts with the periphery of cam 54.

At its outer end arm 55 is formed with a threaded bore 61 the axis of which preferably, as shown, is coincident with the axis of the valve stem when roller 60 is engaged with the lowest or concentric surface portion of cam 54, and which also preferably extends entirely through the arm. Arm 55 is provided with an adjustable impacting section comprising a contact head 62 having a threaded stem portion 63 screwed into the threaded bore 61 of the arm. The head is formed with flat sides for engagement of a wrench therewith, preferably being hexagonal in plan view, as shown, and the top or impact face 64 of the head is preferably of dome shape, as shown, for easy action on the lower end of the valve stem.

The male and female screw threads which connect the two relatively adjustable sections of the tappet, in each of the constructions shown and above described, are of special construction. As the same form of threading is employed in each tappet shown, a description of the coupling threads in connection with a tappet constructed as in Figs. 1, 4, 6, 7, 9 and 10 will suffice for all. As most clearly shown in Figs. 9 and 10 the male and female coupling threads are relatively displaceable between positively fixed limits crosswise of the threads, or axially of the screw thread connection, from free turning relation into a tight locked position in which the threads are frictionally gripped one on the other under elastic stress within the elastic limit of the metal of which the two sections of the tappet are formed, the engaged mutually gripped thread surfaces making an angle with the axial line of the threads within the angle of friction of the surfaces in contact whereby the two sections will be positively held against accidental relative turning movement when displaced into locked relation.

Each thread is preferably formed with two helicoidal locking surface portions and two helicoidal abutment surface portions for positively limiting crosswise thread displacement, one of said abutment portions taking the shocks and stresses incident to valve opening actions of the tappet on the valve stem. The thread ribs are substantially narrower than the thread grooves in which they engage, the tops of the ribs and bottoms of the grooves forming the locking surface portions and the abrupt side faces of the ribs forming the abutment surface portions of the threads. The male thread on the impact section of the tappet has locking surface portions 65 and 66, each making an angle transversely thereof with the axial line of the thread within the angle of friction, and abutment surface portions 67 and 68, each making an angle with the axial line of the thread outside of the angle of friction and, preferably, a very abrupt angle. The female thread on the main body section of the tappet has locking surface portions 69 and 70 opposed to and parallel with locking portions 65 and 66 of the male thread, and abutment surface portions 71 and 72 opposed to and parallel with abutment portions 67 and 68 of the male thread.

An important feature of the adjustable screw connection is that the direction of slope of the locking surfaces is inward toward the axis of the connection in the direction away from the impact head of the tappet, or the direction of screwing the two parts of the tappet together, so that the displacement of the threads from the free-turning to locked relation is in a direction shortening the tappet and in a direction for effecting said displacement by the valve opening thrust and impacts of the tappet on the valve stem. Another important feature is that the two sections of the tappet are adapted to be displaced slightly by direct rectilinear movement of one section relatively to the other axially of the screw thread connection in a direction shortening the tappet, while the tappet has a fixed extent of throw.

The above described construction not only permits easy and rapid adjustment of the tappet mechanism, but affords an adjustment of great utility and efficiency in poppet valve mechanism, particularly in poppet valve mechanism for internal combustion engines. In operating poppet valves, and particularly poppet valves of internal combustion engines for motor vehicles, it is important that the operating means be adjustable to permit complete seating of the valves under force of the valve springs irrespective of temperature conditions, and it is also desirable that undue noise be eliminated in the operation of the valve mechanism. To the foregoing ends a clearance should exist between the valve stem and the actuating device therefor (under all temperature ranges in motor operation) when the low surface of the cam is coactive with the tappet, i. e. during the time intervals the valve is intended to be closed. This clearance should not be greater than necessary to insure such seating, as an unnecessarily large clearance causes noisy operation of the valve mechanism.

In adjusting the operating mechanism of the present invention, it is simply necessary to screw the impact section of the tappet upward until its contact face touches the lower end of the valve stem, with the low surface of the cam supporting the other or main section of the tappet, as shown in Fig. 6. After effecting this initial adjustment of any or all of the tappets, the final adjustment and locking of the two thread connected tappet sections against accidental relative screwing are effected simultaneously by operating the motor. It will be obvious that the first turn of the cam shaft will initially jam the threads under back pressure of the strong valve seating spring and that as the motor continues to operate the threaded stem of the contact section will be hammered directly axially into the threaded socket until the limit of crosswise thread displacement is reached, as shown in Fig. 7, and the contact section is securely locked against accidental screwing in or out of the socket.

The extent of crosswise displacement of the threads from normal unlocked or free-screwing relation into fully locked relation determines the extent of clearance between the tappet and valve stem when the valve is closed. It is, of course, desirable that the usual clearances for easy starting of the male thread into the female thread be provided, and such clearances are indicated in the "easy starting" relation of the threads shown in full lines in Fig. 9, the normal free-screwing or unlocked relation of the threads in effecting the preliminary screw adjustment of the tappet being shown in dotted lines in Fig. 9, the male thread taking this dotted position under the action of gravity. The initial locking thrust against the force of the valve spring, above described, sufficiently binds the threads to preclude relative screwing movement until the male member is tapped axially fully into tight locked position.

Another important feature of the adjustable connection is that the male thread takes a self-centering seat in the female thread, the threads nesting in the manner of a series of frusto-conical plugs in a corresponding series of frusto-conical sockets. This feature prevents development of a lateral wabbling motion of the impact section in the socket, an important factor in causing the undesirable accidental screwing movement of the ordinary adjustment screws employed in known forms of tappet mechanisms. This is important, since the coaction between the valve and tappet, in such constructions as those shown in Figs. 1 and 3, and between the tappet and valve stem, in the construction shown in Fig. 2, tend to set up lateral vibrations of the tappet contact head.

As heretofore stated, the slope of the locking surfaces and extent of crosswise thread displacement are correlated for full interjamming of the threads without stretching the female member of the tappet beyond its elastic limit. It is, therefore, possible to readjust the tappet repeatedly to take care of wear without impairment of the efficiency of the locking action.

It will be obvious that any suitable means other than that shown, may be employed to impart to an adjustable tappet embodying the invention a fixed extent of throw.

It is obvious that the invention is not limited to the constructions employing the particular form of male and female coupling threads shown in the drawings, as other forms of thread connections wherein the male and female threads are relatively displaceable axially a slight extent from free-screwing relation into tight jammed self-locking relation may be employed. It will be obvious also that it is not necessary to provide a threading wherein each thread has two locking surface portions.

What I claim is:

1. In a poppet valve mechanism for internal combustion engines, the combination with a spring-seated poppet valve controlling a passage communicating with an engine cylinder and means forming a seat for said valve, of actuating means for the valve comprising an adjustable tappet having a main section and a relatively adjustable valve-impacting head section, and a rotary cam operative on the main section of the tappet to impart a fixed extent of throw thereto, said tappet sections having a screw thread coupling the axial line of which extends substantially in the direction of reciprocation of the valve and the threads of which coupling are relatively displaceable to a positively limited extent axially of the coupling from free-turning relation into self-locked relation by direct rectilinear movement of the impact section under reaction forces exerted on the tappet as an incident to operation of the valve mechanism.

2. A poppet valve mechanism as claimed in claim 1, wherein the coupling threads have helicoidal locking surface portions correlated for displacement one across the other while in contact from free-screwing into self-locked relation by said reaction forces, following operation of the engine after an initial screw adjustment of the head section into contact with the valve with the tappet fully retracted, and also have helicoidal abutment surface portions correlated for positively limiting the extent of said displacement by said reaction forces.

3. In a valve mechanism, the combination with a spring seated valve, of adjustable means for periodically lifting the valve from its seat comprising a tappet and means for vibrating said tappet, said tappet having a main section and an impact head section screw-thread connected with the main section for adjustment toward and from the valve, the connecting threads having helicoidal abutment surface portions and helicoidal thread-locking surface portions, the abutment portions of the two threads being correlated for direct axial displacement between the threads to a positively limited extent, and the thread-locking portions of the two threads sloping transversely thereof toward the axial line of the threads within the angle of friction and in a direction substantially opposite to that in which the impact section moves on its valve lifting stroke, said locking portions of the two threads being correlated for jamming under an elastic stress within the elastic limit of the tappet material upon a direct displacement of the impact head section relatively to the main section axially of the screw thread connection in a direction substantially opposite to that of its valve lifting stroke and to the limit of thread displacement in said direction, said locking portions being also coactive for free screw adjustment of the head section at the pitch rate when the threads are displaced out of locked relation.

4. An adjustable tappet mechanism comprising a tappet, and means for imparting a fixed throw to said tappet, said tappet having a main section operatively connected with said throw imparting means and an impact head section thread coupled with the main section for screw adjustment relatively thereto substantially in the path of throw of the tappet head, the threads forming the adjustable coupling being displaceable crosswise of the threads from free-turning relation into self-locked relation by direct rectilinear movement of the head section axially of the thread coupling in a direction opposed to the direction of the tapping strokes of said tappet.

5. An adjustable tappet mechanism as claimed in claim 4, wherein the coupling threads have locking surface portions sloping crosswise of the threads toward the axial line of the coupling in the direction of the return strokes of the tappet and making an angle with said axial line within the angle of friction of the tappet material, and wherein said threads also have abutment surface portions making an abrupt angle with the axial line of the coupling for arresting positively the direct rectilinear displacement of the head section in thread-locking direction after the threads take a mutual locking grip on each other and for also taking the shocks of tappet impacts upon a part actuated by the tappet mechanism.

6. An adjustable tappet comprising a main body portion and an impact head section having male and female coupling threads connecting the same, said threads being relatively displaceable crosswise of each other from free-turning relation into self-locked relation by force exerted on the impact surface of the head and having coactive locking surface portions movable one across the other by said displacement and making an angle with the axial line of the coupling within the angle of friction of the tappet material, said locking surface portions sloping toward the said axial line in a direction away from that in which the impact surface of the head faces.

7. An adjustable tappet as claimed in claim 6, wherein the main section is of uniform non-circular external contour in transverse section from a point adjacent that end thereof nearest the impact end of the tappet to the opposite end of said main section and of cylindrical external contour in transverse section throughout the remaining portion of its length, and wherein the impact head section comprises a threaded shank with an enlarged striking head at one end having a plurality of flat side edges.

8. An adjustable poppet valve mechanism comprising an actuated device, and a thrust imparting device associated therewith for imparting movement thereto in one direction only, characterized by the fact that one of said devices comprises two parts one of which is directly acted upon by the other device and is adjustably connected to the other part by screw coupling threads axially telescopic by reaction force incident to thrust action of the thrust-imparting device on the actuated device from a free-screwing relation to a self-locking relation against accidental screwing.

9. An adjustable tappet mechanism comprising a member normally urged in one direction, and a second member coactive therewith for intermittently imparting movement thereto in the opposite direction only, one of said members comprising two relatively adjustable parts adjustably coupled by screw threads of equal and constant pitch the axial line of which extends substantially in the path of movement of said member, said threads having friction locking surfaces telescopic one within the other under elastic tension by reaction force incident to thrust action of the second member on the first mentioned member when the mechanism is put into action.

10. An adjustable tappet mechanism as claimed in claim 9 wherein the coactive friction locking surfaces of the coupling threads slope transversely of the threads toward the axial line of the coupling in the direction of said reaction force and make an angle with said axial line which is within the angle of friction of said surfaces.

11. An adjustable tappet mechanism comprising a member normally urged in one direction, and a second member contactive therewith to intermittently urge it in the opposite direction only, one of said members comprising two parts having a screw thread connection for adjustment of one of said parts toward and from the other member, the threads of which connection have coactive helicoidal locking surfaces axially displaceable from free-screwing relation to self-locking relation and correlated for frictionally jamming one within the other under elastic tension to lock the parts against accidental screwing movement upon axial telescopic displacement therebetween by the reaction between the members when the mechanism is actuated after a screwing adjustment.

12. An adjustable tappet mechanism as claimed in claim 11, wherein the threads have coactive helicoidal abutment surfaces disposed abruptly to the axial line of the threads correlated for positively limiting the extent of direct axial telescopic displacement between the threads.

13. An adjustable tappet mechanism as claimed in claim 11, wherein the locking surfaces slope transversely of the threads at an angle with the axial line of the threads which is within the angle of friction of said surfaces, and the threads have helicoidal abutment surfaces disposed abruptly to the axial line of the threads and correlated for engagement to limit the extent of inter-jamming of the locking surfaces.

14. An adjustable tappet comprising two portions having coupling screw threads of equal and constant pitch axially telescopic within a positively limited range by reaction force exerted on the thrust transmitting portion of the tappet from a free screwing relation to a self-locking relation in which helicoidal portions of the threads are frictionally telescoped one within the other under an elastic stress within the elastic limit of the tappet material.

15. A tappet having a main body portion and an impact head connected by coupling screw threads the axial line of which passes through the impact face of the head, said threads having helicoidal abutment surfaces disposed abruptly to the axial line of the threads and correlated to permit a limited direct axial displacement between the threads from a free-screwing to a self-locked relation, and also having helicoidal locking surfaces correlated for forcing thereof one within the other while in contact into elastically interfitted self-locking relation under a stress within the elastic limit of the tappet material by thrust upon the impact face of the head, said locking surfaces having a slight slope transversely of the threads towards the axial line of the threads in a direction away from the impact face of the head.

In testimony whereof I hereunto affix my signature.

HUGUES LOUIS DARDELET.